United States Patent Office 2,848,750
Patented Aug. 26, 1958

2,848,750

PROCESS FOR PRODUCING SYNTHETIC RESIN ARTIFICIAL DENTURES WITH LININGS

Herbert Sannecke, Leverkusen, and Hermann Schnell, Krefeld-Uerdingen, Germany, assignors to Farbenfabriken Bayer Aktiengesellschaft, Leverkusen, Germany, a corporation of Germany No Drawing. Application June 22, 1955
Serial No. 517,392

Claims priority, application Germany July 5, 1954

6 Claims. (Cl. 18—55.1)

The present invention relates to a process for producing synthetic resin artificial dentures with linings, and is an improvemnet in or modification of the invention disclosed in copending application Serial No. 286,424 filed May 6, 1952.

In the dental art, artificial dentures prepared from synthetic resins are manufactured by mixing polymers of, for example, polymethyl methacrylates to form a paste with monomeric methyl methacylates, and by hardening this paste in a mold under pressure and heat with the addition of catalysts.

In many cases, it is desirable to provide that surface of the denture which is in contact with the tissues of the mouth with a lining of soft material which, because of its resilience, does not produce any pressure points, prevents particles of food from penetrating between the mouth tissues and the denture as a result of its tight fit, and improves the adhesion of the denture to the said tissues.

The copending application discloses a process of providing synthetic resin dentures with soft, resilient linings which comprises swelling a soft, resilient, plastic plate or foil in a monomeric, polymerizable vinyl compound which forms polymers compatible with the material of the denture and which adheres strongly to the denture after polymerization, or in a mixture of such vinyl compounds, applying the resultant soft, resilient plastic plate or foil to a synthetic resin denture which has previously been recessed to receive a lining, and polymerizing the swelled monomeric compound or compounds, preferably by applying pressure and heat in the presence of a polymerization catalyst.

In the present process the process of the parent specification is modified in that the lining is applied, not to a finished denture, but to a monomer/polymer mass, and the latter is then polymerized to form the denture.

Accordingly, the present invention provides a process of producing synthetic resin dentures with linings, wherein a piece of soft resilient plastic lining material is swelled in a monomeric polymerizable compound or mixture of such compounds, the soft lining material treated in this manner is applied to a mass of a liquid polymerizable monomeric compound, such as a methacrylic ester, and a polymer, such as a polymethacrylic ester, and polymerization is thereafter carried out in a mold having the shape of the desired denture in the presence of a polymerization catalyst.

The lining material can be of any desired form, for example sheets, plates, foils, wires and rings; the present process allows the production of linings with a very good power of adhesion by means of a simple process which in addition offers the advantage of ensuring reliable adhesion even in difficult cases.

The soft resilient lining material can, for example, be impregnated by coating it with the monomer or monomer mixture prior to use.

The lining material, such as plates or foils, used for the process of the present invention can be produced from soft resilient synthetic resins obtained by polymerization or polycondensation. Substances which are particularly suitable for this purpose are co-polymers of those monomeric compounds which when polymerized by themselves produce hard plastics, such as alkyl methacrylates, the alcohol radicals of which contain from 1 to 3 carbon atoms, as for instance, methyl methacrylate, with a second or several monomeric components which, when polymerized by themselves, produce soft synthetic resins, such as aliphatic esters of acrylic acid, the alcohol radical of which having from 1 to 15 carbon atoms and aliphatic esters of methacrylic acid, the alcohol radical of which have 4 to 15 carbon atoms, as for instance, ethyl acrylate, butyl acrylate, hexyl acrylate and octyl acrylate, and isobutyl methacrylate, isohexyl methacrylate, octyl methacrylate and lauryl methacrylate. These latter monoolefinic components are applied in amounts of 25–80, preferably 50–80 percent of weight as based on the total amount of monomers. It is advantageous for the plates, sheets or foils to be prepared from crosslinked copolymers, for example those which have been obtained by additionally using polymerizable monomeric compounds containing at least two ethylenic double bonds, such as divinyl benzene, glycol di-acrylate, glycol dimethacrylate, butanediol dimethacrylate or hexanediol dimethacrylate, preferably in amounts of 0.1–10% as calculated on the total weight of monomers.

As monomeric polymerizable compounds for the initial swelling of the aforementioned lining material, it is advantageous to use the same monomers or monomer mixtures from which the soft elastic lining was produced. However, it is also possible to use other monomers or monomer mixtures provided that these swell the soft synthetic resin mass and that the synthetic resin formed by the polymerization is compatible with the synthetic resin forming the lining and bonds firmly to the synthetic resin of the artificial denture. Examples of such monomeric polymerizable compounds are esters of methacrylic acid, such as methyl methacrylate, ethyl methacrylate or isohexyl methacrylate, and esters of acrylic acid, such as methyl acrylate, ethyl acrylate, butyl acrylate and octyl acrylate. The choice of the monomer or monomer mixtures renders it possible for the softness of the lining to be adjusted as required and to produce a firm bond with the synthetic resin of the denture. When using polymethyl methacrylates, which are the substances predominantly used for the manufacture of synthetic resin artificial dentures, a firm bond is obtained, for example by using as swelling agents for the soft lining structures monomeric methyl methacrylate, butyl methacrylate, isobutyl methacrylate or isohexyl methacrylate, or by using mixtures of methyl methacrylate with esters of acrylic acid, such as for example methyl acrylate, ethyl acrylate, isohexyl acrylate or dodecyl acrylate, which mixtures contain more than 50% of methyl methacrylate. The soft linings can also be firmly bonded to the polymethyl methacrylate artificial dentures by using other monomer mixtures, more especially those consisting of more than two components. It is advantageous to incorporate polyfunctional vinyl compounds, such as are described above, into the monomers or monomeric mixtures used for the swelling operation. By this means, after the polymerization, there are obtained resilient linings having particularly desirable properties, such as high resilience, low water absorption and high mechanical strength. It is obvious that the process does not exclude the possibility of adding dyestuffs, pigments, plasticisers, resins or fillers, for example, to the plates or monomers.

The polymerization accelerators necessary for carrying out the polymerization of the monomers in the swelled linings can be dissolved, prior to the swelling of the linings, in the monomers or monomeric mixtures used for swelling the plates. They can also be added to the lining mass, for example by superficially impregnating a foil of the soft resilient synthetic resin with the catalyst and covering this foil with a second foil, a homogeneous plate containing the catalyst being produced by pressing the two foils together. Suitable polymerization catalysts include peroxides, such as benzoyl peroxide, p-chlorobenzoyl peroxide and cumene hydroperoxide. Furthermore, the known redox systems, such as, for example, combinations of peroxides and reducing agents, for instance trihexylamine and p-toluene sulphinic acid, are suitable as polymerization catalysts. In the latter case it is advantageous to incorporate one component of the redox system, e. g. the oxidation agent, into the plates, while the other component, e. g. the reducing agent, is added to the monomers used for swelling the plates.

The quantity of the monomers or monomeric mixtures used for swelling the soft, resilient plates is controlled in such a manner that the plate is rendered sufficiently moldable to allow of easy shaping in the mold, normally a gypsum mold. Generally 20 to 50%, calculated on the weight of the plate to be swollen, suffices to bring about the desired effect.

The following examples indicate how the process can be carried out in practice:

*Example 1*

A gypsum mold is prepared from the wax model required for the production of an artificial denture. A mixture of 30 percent by weight of monomeric methyl methacrylate and 70 percent by weight of a powder of a polymer of methyl methacrylate is placed in one half of the mold and covered by a polyethylene foil. After heating the second half of the mold, the mold is closed and initially pressed. After about five minutes, the mold is opened and excess material removed.

A suitably cut piece of soft, plastic plate which is about 0.5 to 1 mm. thick and which is prepared from a co-polymer of 35 parts by weight of methyl methacrylate, 64.2 parts by weight of butyl acrylate and 0.8 part by weight of methylene glycol dimethacrylate, is laid on the pre-molded powder, covered with a second polyethylene foil, the second half of the mold, which is still warm, is replaced and the complete mold is initially pressed once again. After a few minutes, the mold is opened, and the soft plastic plate is removed and accurately trimmed in accordance with the contours which can now be clearly detected.

After removing the polyethylene foil, the remaining soft, plastic plate is swelled for one minute in a prepared mixture consisting of 60 parts by weight of methyl methacrylate, 40 parts by weight of butyl acrylate and 0.005 part by weight of p-chlorobenzoyl peroxide. The soft swelled plate is then lifted out of the mixture and after gently removing the excess monomeric mixture, is returned to the original mold containing a mixture of powder and liquid. The second half of the mold, which should at this stage be re-heated, is laid on the first half of the mold with interposition of a polyethylene foil and the mold is then closed, the said mold being kept for about fifteen minutes under a slowly increasing pressure. After this period, the mold is opened and the excess material removed, and the mold is finally closed. The warm half of the mold causes excellent plasticization of the soft, plastic plate and produces complete freedom from tension.

Polymerization is then carried out in the usual manner for half an hour at 70° C. and for 1½ hours using water at boiling point. After removal from the mold, an artificial denture is obtained which is provided with a very strongly adhering soft lining at the places required. A surprising feature is the great smoothness of the lining and the excellent contour formation.

*Example 2*

The procedure is initially as described in Example 1. After removal of the polyethylene foils from the mixed and pressed polymer and from the removed pre-shaped soft plastic plate, the pressed polymer is coated twice with the liquid monomeric mixture indicated in Example 1 by means of a bristle brush. The coated surface is simultaneously scattered with large chips of polymerized methyl methacrylate. The soft shaped plastic plate is likewise uniformly coated two or three times with monomeric mixture. The impregnated soft plastic plate is then placed once again in the half of the mold charged with polymer paste and covered with a polyethylene foil. The second half of the mold which is to be reheated is again laid on the filled mold half, thereby closing the mold, and the entire mold is left for about fifteen minutes under a slowly increasing pressure. After opening the mold, the polyethylene foil is removed. The exposed soft plastic layer is now also coated two to four times with the monomeric mixture, depending on the degree of softness required of the soft plastic material. The mold is then finally closed and left under the press for ten minutes at a pressure which slowly increases. Polymerization is then carried out as described in Example 1. The result is a denture having a soft lining which is completely free from tension and which adheres in an excellent manner; the degree of softness of the said lining can be adjusted as desired and the lining has a remarkably smooth surface and very accurately reproduces all details.

*Example 3*

If a permanently soft valvelike cushioning of a denture is required in the region of the sub-plicature of the jaw, or a transverse terminal boundary of a denture, soft synthetic resin profiled wires of a wide variety of types can be used as well as sections of a soft plastic plate with the same success when using one of the methods described in Examples 1 and 2.

What we claim is:

1. A process of preparing a hard synthetic resin denture having a soft liner firmly adhered thereto comprising placing in a dental mold a mixture of a powdery polymer of a monoethylenically unsaturated ester and a liquid monoethylenically unsaturated ester, molding said mixture into a shaped denture of doughy consistency, preparing a sheet of soft plastic liner from a copolymer of a lower alkyl methacrylate in which the alkyl radical has from 1–3 carbon atoms and a second monomer copolymerizable therewith selected from the group consisting of (1) alkyl esters of acrylic acid in which the alkyl radical has 1–15 carbon atoms, and (2) alkyl methacrylates in which the alkyl group is from 4–15 carbon atoms, shaping said copolymeric sheet to fit the interior of the denture so as to form a soft resilient shaped liner, then swelling said shaped liner in a plasticizing solution of a compatible monomer having a single ethylenic linkage so as to partially impregnate the surface of said liner with said monomer, placing the swelled liner on the denture, and heating the combination of denture and liner in the mold so as to simultaneously cure the liner and denture and to effect polymerization of the monomer component of each, and removing from the mold a hard denture having a soft liner firmly welded thereto.

2. Process of claim 1 wherein the said second monomer employed in the liner constitutes 50–80 percent by weight of the total monomers.

3. Process of claim 1 wherein the liner sheet contains a minor amount of cross-linking component.

4. Process of claim 1 wherein the plasticizing solution employed to swell the liner is selected from the group consisting of lower alkyl esters of acrylic acid, lower alkyl esters of methacrylic acid, and mixtures of lower alkyl esters of both acrylic and methacrylic acid.

5. Process of claim 1 wherein the denture dough is a mixture of polymethyl methacrylate powder and methyl methacrylate monomer.

6. Process of claim 1 wherein the liner is formed by polymerizing a mixture of approximately 35 percent methyl methacrylate and approximately 65 percent butyl acrylate.

References Cited in the file of this patent

UNITED STATES PATENTS

| | | |
|---|---|---|
| 2,551,812 | Nelson | May 8, 1951 |
| 2,659,970 | Ingersoll | Nov. 24, 1953 |